US009391348B2

(12) United States Patent
Goldberg et al.

(10) Patent No.: US 9,391,348 B2
(45) Date of Patent: Jul. 12, 2016

(54) ELECTROCHEMICAL CELL OF AN ACCUMULATOR

(75) Inventors: Adrian Goldberg, Dresden (DE); Peter Marcinkowski, Dresden (DE); Claudia Feller, Dresden (DE); Mareike Wolter, Dresden (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 578 days.

(21) Appl. No.: 13/823,884

(22) PCT Filed: Sep. 14, 2011

(86) PCT No.: PCT/DE2011/001745
§ 371 (c)(1),
(2), (4) Date: May 14, 2013

(87) PCT Pub. No.: WO2012/041278
PCT Pub. Date: Apr. 5, 2012

(65) Prior Publication Data
US 2013/0236755 A1   Sep. 12, 2013

(30) Foreign Application Priority Data
Sep. 15, 2010 (DE) .......................... 10-2010-046307

(51) Int. Cl.
*H01M 10/48* (2006.01)
*H01M 10/0525* (2010.01)

(52) U.S. Cl.
CPC .......... *H01M 10/48* (2013.01); *H01M 10/0525* (2013.01); *H01M 10/484* (2013.01); *H01M 10/486* (2013.01); *Y02E 60/122* (2013.01)

(58) Field of Classification Search
None
See application file for complete search history.

(56) References Cited

U.S. PATENT DOCUMENTS

| 5,142,266 A | * | 8/1992 | Friese .................... G01K 7/223 338/22 R |
| 2009/0195210 A1 | | 8/2009 | Takeuchi et al. |
| 2010/0124250 A1 | | 5/2010 | Lachenmeier et al. |
| 2011/0039137 A1 | * | 2/2011 | Engle .................. H01M 10/486 429/90 |
| 2011/0274139 A1 | * | 11/2011 | Woodard ................ G01K 7/00 374/120 |

FOREIGN PATENT DOCUMENTS

| DE | 102008057710 A1 | 5/2010 |
| JP | H 1116610 A | 1/1999 |
| JP | 2002313431 A | 10/2002 |
| WO | WO 2006/049393 A1 | 5/2006 |
| WO | WO 2011/019458 A1 | 2/2011 |

*Primary Examiner* — Alix Eggerding
(74) *Attorney, Agent, or Firm* — Jacobson Holman, PLLC

(57) ABSTRACT

The invention relates to electrochemical cells of a rechargeable battery. It is the object of the invention to provide possibilities with which parameters can be determined simply, reliably and with sufficient spatial resolution within the cells of a rechargeable battery in real time and with small additional technical effort. In an electrochemical cell in accordance with the invention, at least one sensor element is arranged within the cell, integrated therein. In this respect, a sensor element is configured as an electrically conductive layer-wise conductor track structure on a surface of a dielectric laminate configured in the form of a thin film. Except for regions arranged at the outer margin provided for an electrical contacting, the conductor track structure is sealed in a fluid-tight manner by a further dielectric laminate which is configured in the form of a film and which is arranged on the conductor track structure.

11 Claims, 4 Drawing Sheets

Figure 3:
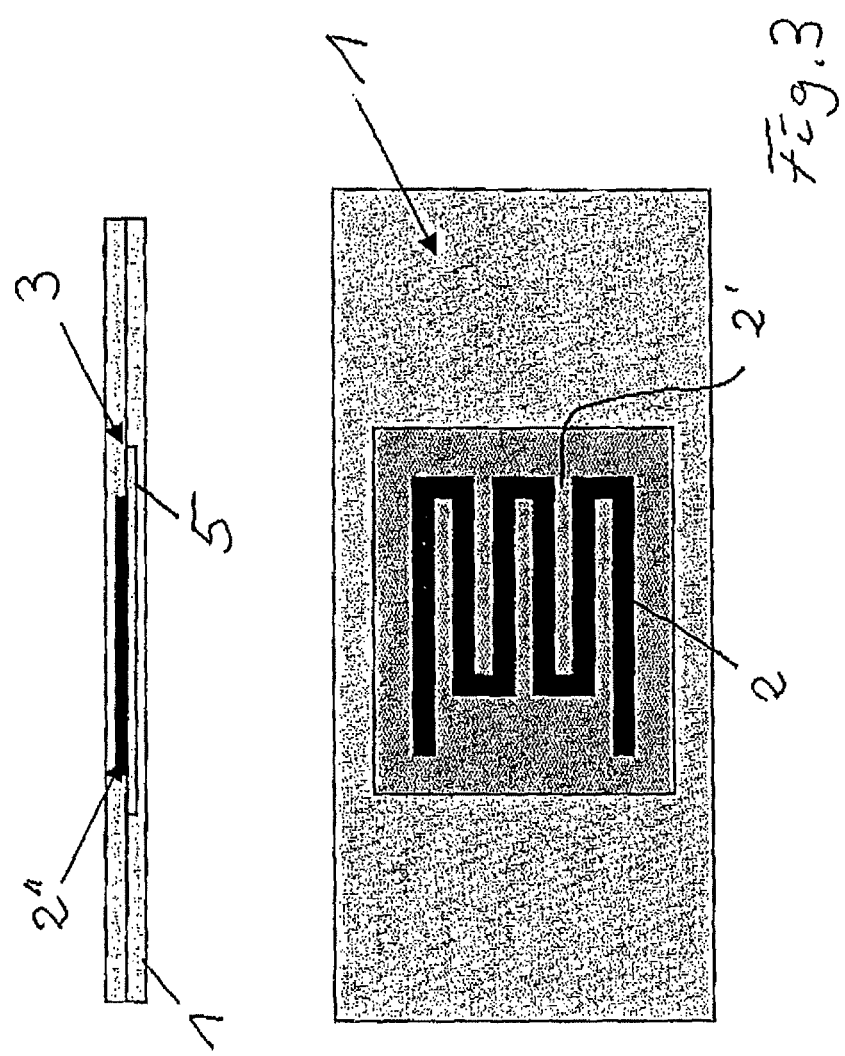

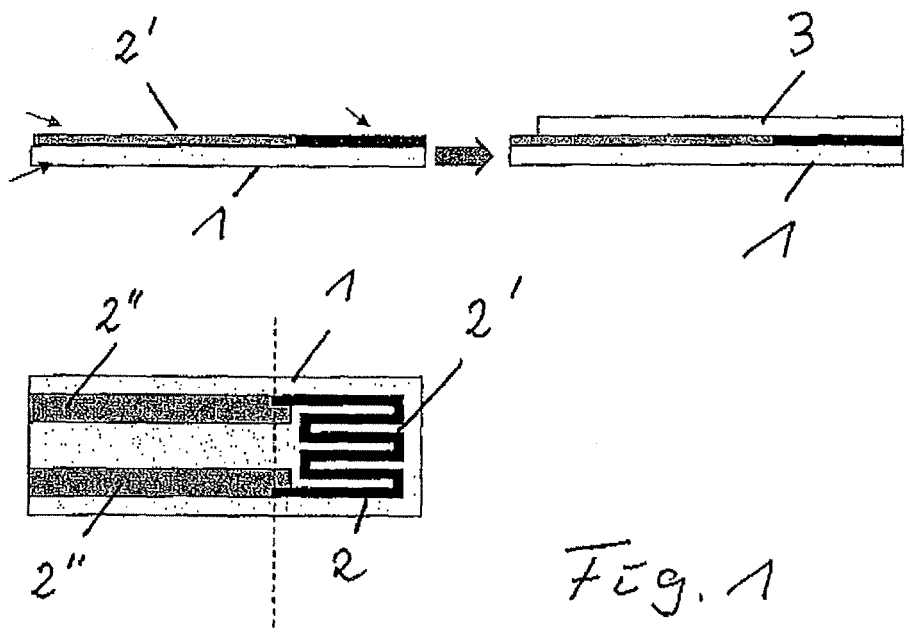
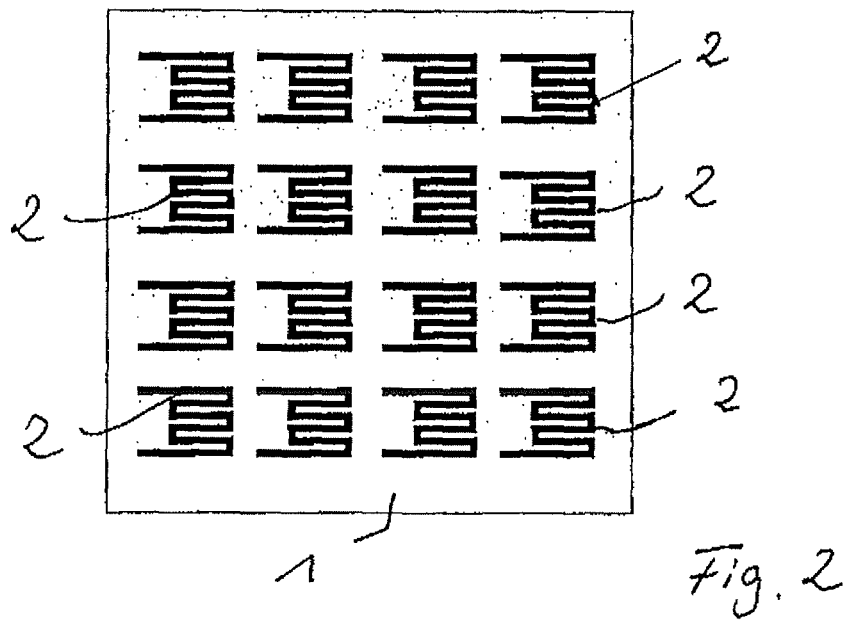
Fig. 1
Fig. 2

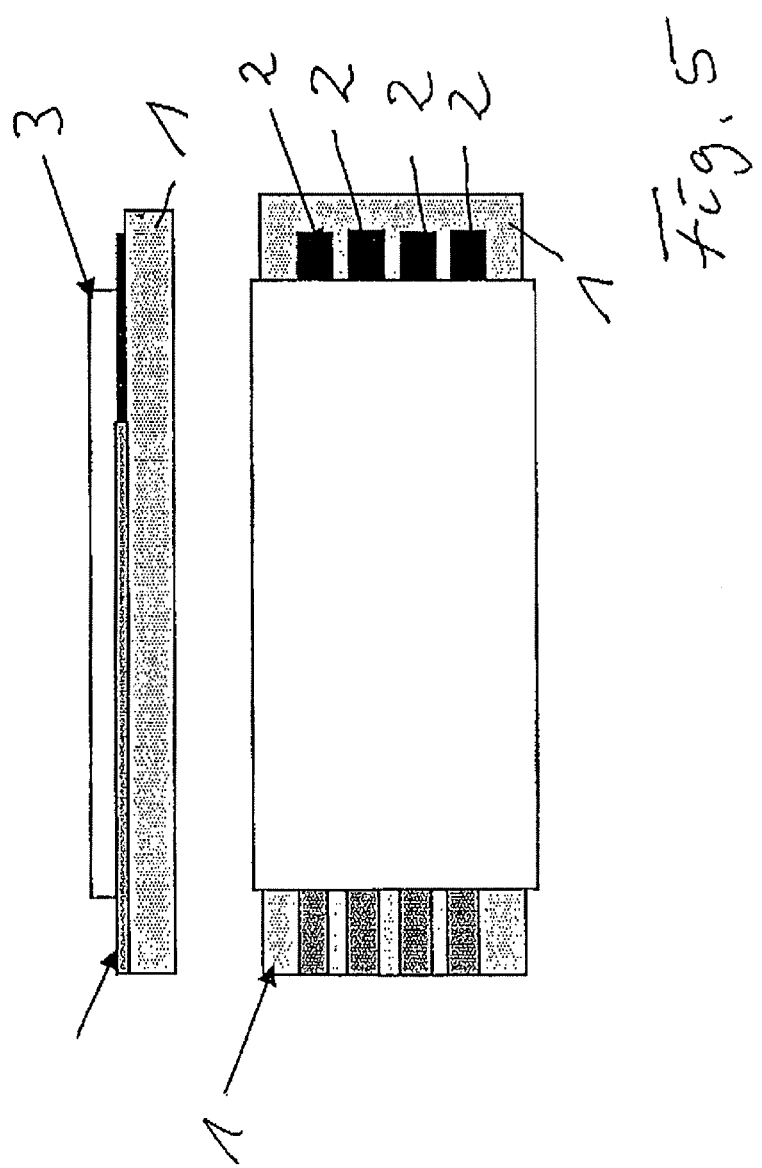

ELECTROCHEMICAL CELL OF AN ACCUMULATOR

This is a national stage of PCT/DE2011/001745 filed Sep. 14, 2011 and published in German, which has a priority of German Patent Application no. 10 2010 046 307.8 filed Sep. 15, 2010, hereby incorporated by reference.

The invention relates to electrochemical cells of a rechargeable battery. In this respect, the rechargeable battery can be formed with one or more such cells. The cells are in particular lithium ion cells, also in the different modifications, such as inter alia also lithium polymer cells or lithium air cells.

An internal detection of parameters in the cells is desired both for the development of new such cells and during their operation. This relates to the instantaneous temperature, the pressure within the cell, the electrical conductivity, impedance and the half-cell potential of the anode and cathode.

As is known, the charging and discharging processes of the lithium ion cells influence their operating behavior and service life. The respective required time also becomes shorter or longer in dependence on the electrical current on charging and discharging. Increased electrical charging and discharging currents, however, result in a temperature increase of the cells. The problem known as "thermal run-away" can in particular arise in lithium ion cells where a further internal temperature increase occurs on the reaching of a threshold value temperature which can result in the destruction of the cell and even in a fire. A locally limited overheating within the cell, which can also be called a hot spot, is sufficient for this.

There has therefore long been an interest in particular in measuring the temperature of the cells in question. In this respect, previously suitable temperature sensors are attached with external access to cells or whole rechargeable batteries, such as is e.g. known from WO 2006/049393 A1 and US 2009/0195210 A1. It is thus, however, not possible to detect locally limited temperature increases within electrochemical cells; this is at least not possible within a sufficiently short time so that the above-named problems cannot be prevented with sufficient reliability. Furthermore, elevated temperatures also shorten the service life of the cells.

A technical solutions has therefore been proposed in DE 10 2008 057 710 A1 with which temperatures within such cells can be determined. For this purpose, glass fibers configured or operable as temperature sensors should be present within the cell. However, problems hereby arise with the temperature measurement signals obtained in this manner which have to be processed in a complex manner and first have to converted, for example for a regulation of the charging and discharging processes, into a form suitable for this.

Furthermore, no suitable technical solution is yet known with which the internal pressure or the pressure relationships varying as a consequence of the swelling and shrinking of electrodes, which occur due to the charging and discharging, can be detected within the cells.

This also applies to the determination of the electrical conductivity, the impedance and the half-cell potential.

It is therefore the object of the invention to provide possibilities with which parameters can be determined simply, reliably, with sufficient spatial resolution, in real time and with a small additional technical effort within the cells of a rechargeable battery.

This object is achieved in accordance with the invention by the features of claim 1. Advantageous embodiments and further developments of the invention can be realized using features designated in the subordinate claims.

At least one sensor element is present at an electrochemical cell of a rechargeable battery in accordance with the invention. The sensor element(s) is/are in this respect arranged within the cell, integrated therein, and a sensor element is configured as an electrically conductive layer-wise conductor track structure on a surface of a dielectric laminate configured in the form of a thin film. The conductor track structure is moreover sealed as required in a fluid-tight manner, except for regions arranged at the outer margin and provided for an electrical contacting, by a further, dielectric upper laminate which is configured in the form of a film and is arranged on the conductor track structure.

These laminates can be formed from plastic or from a ceramic material. Examples for suitable polymers are polyimide, polyethylene, polypropylene, PTFE, polycarbonate, Nafion or polyurethane.

The polymers used should be stable up to a temperature of at least 80° C. and should be resistant under the conditions present inside an electrochemical cell.

A suitable ceramic material is, for example, $Al_2O_3$, $Si_3N_4$, $SiO/AL_2O_3$ or $ZrO_2$.

Plastics are in particular suitable due to their flexible deformability. They can thereby also be used in wound cells.

A sensor element can be configured as a temperature sensor, a pressure sensor, a force sensor, a sensor for determining the electrical conductivity or the half-cell potential and/or a sensor for measuring the impedance in the cell.

A sensor element which can be used in the invention can have a maximum thickness of 150 µm, preferably <100 µm. It is thereby easily possible to use it within a cell and not to negatively influence the actual operation of the cell.

A sensor element configured as a temperature sensor can be a thermistor or a thermal element. With a thermistor, a change in the electrical resistance varying in dependence on the temperature can be measured and the temperature in the cell can be determined from this.

With a thermal element, the conductor track structure can be formed with two different metals which are electrically conductively connected to one another in one region. The Seebeck effect can be utilized in the temperature determination.

Exposed regions of the conductor track structure provided for an electric contact can be formed from the different metals or these regions can be electrically conductively connected to the different metals.

A sensitive region can be formed at the conductor track structure. It can be meandering, for example. With a pressure sensor or force sensor, at least one region of a sensitive region can be formed with a piezoceramic material which can be contacted via the electrically conductive conductor track structure.

At least a part of the electrical conductor track structure can be formed by metallic particles which are contained in a binder. The formation of such a conductor track structure can take place by application of a thin film of such a mixture onto a surface of a laminate, for example by screen printing, inkjet printing, dispersion printing, pad printing or aerosol printing. The metallic particles in the binder matrix should be distributed therein and should be contained in such a sufficient number that the electrical conductivity is given.

A binder, which can be a suitable polymer, can be hardened after the application and after the formation of the conductor track structure as a thin film. It can also take place after the placing on of the upper laminate covering the conductor track structure. This procedure can be carried out using possibilities known for the hardening of polymers.

The different metals having good electrical conductivity can be used as metals, such as platinum, silver, gold or also copper. If a sensor element is configured as a thermal element, a part of the conductor track structure can also be formed from $RuO_2$.

At least for a part of the conductor track structure, which can only form an electrically conductive connection for a contact from the outside, there is the possibility of using a laminate which is provided with a correspondingly structured copper film on the surface of the laminate on which the conductor track structure is present.

With ceramic laminates, an outer envelope of polymer material, for example polymer film, can be present to achieve an additional protection.

There is the possibility with the invention of immersing one or more sensor elements in the electrolyte of a cell, which at least relates to the respective sensitive region. Sensor elements can, however, also be attached to a surface of an electrode of a cell or of a separator device present within the cell.

The laminate with sensor element(s) should be arranged or configured in the cell such that at least one electrode has electrically conductive contact to the electrolyte of the cell so that the electrode(s) and the electrolyte are electrically conductively connected to one another.

A small total thickness of sensor elements which can be used in a cell can be achieved by the use of thin films for the laminates and by the use of thick film technology for the conductor track structure. Freely scalable geometries of conductor track structures with a small layer thickness can be manufactured by the metal/polymer mixtures which can be used for the printing of the conductor track. Depending on the composition of the mixture used, different properties which can influence the respective sensor element can be set.

Small time constants can be observed for the measurement by the possible use of an electrically resistive measuring method, said small time constants resulting in a real-time detection of varying temperatures, pressures, forces or conductivities. It is thus possible to directly influence the regulation in the charging and discharging processes of cells in that the respective electrical charge and discharge current can be optimized, which contributes to a shortening of the time required for this purpose, and the security is, however, observed in this process. In experiments, charging and discharging were possible with 10% higher electrical currents.

An individual sensor element or also a plurality of such sensor elements can be integrated into a cell due to the small dimensions and mass. A very exact measurement can be carried out directly at specific locations or a spatially resolved measurement can be carried out with a plurality of sensor elements.

The invention will be explained in more detail in the following with reference to examples.

Figure 4:
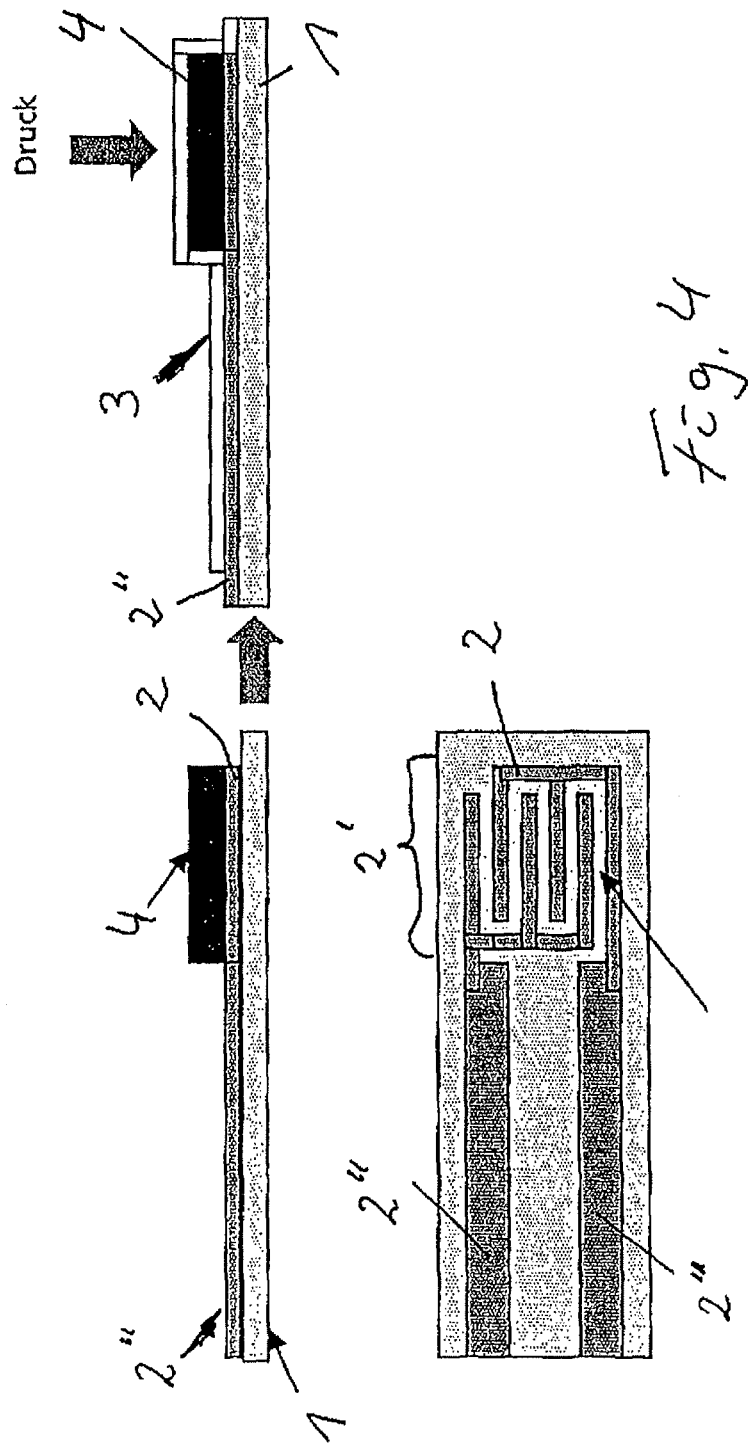

There are shown:

FIG. 1 in three views, an example of a sensor element for determining the temperature which can be used with electrochemical cells;

FIG. 2 a two-dimensional matrix arrangement of sensor elements;

FIG. 3 in two views, a further example of a sensor element for determining the temperature which can be used with electrochemical cells;

FIG. 4 in three views, an example of a sensor element for determining the pressure or for a force measurement which can be used with electrochemical cells; and FIG. 5 in two views, an example of a sensor element for determining the electrical conductivity which can be used with electrochemical cells.

In FIG. 1, an example of a sensor element configured for the determination of the temperature is shown in three views.

In this respect, a conductor track structure 2 has been printed onto a 25 μm thick film of polyimide as a laminate 1 by screen printing in a sensitive region 2'. For this purpose, a mixture of a sufficiently viscous polymer was used in which particles of platinum were contained having a mean particle size d50<20 μm.

Before printing, a 25 μm thick film of copper was structured in a photolithographic manner so that electrical connector contacts 2" were formed for or as components of the conductor track structure 2. A thin film of polyimide having a thickness <30 μm was then applied as an upper laminate 3 to this structure.

The total thickness of the sensor element was <90 μm in this respect.

The two laminates 1 and 3 were connected to one another with material continuity such that a hermetic closure was formed at least for the sensitive region 2' in which the conductor track structure 2 is formed in meandering shape.

On application of a constant electrical voltage to the two connector contacts 2" from the outside, the temperature can then be determined using the sensor element since the electrical resistance of the sensor element varies proportionally to the temperature.

A sensor element configured like this example is flexibly deformable and is resistant under the conditions present in the electrochemical cells, in particular as regards the chemical resistance and the temperature resistance.

FIG. 2 is intended to illustrate that a plurality of sensor elements can be used with conductor track structures 2 for the sensor elements formed on a common laminate. A measurement can thereby be carried out with increased spatial resolution. The arrangement of conductor track structures 2 can, however, also be selected, unlike shown in FIG. 2, as an irregular arrangement, for example.

The conductor track structures 2 correspondingly formed on the laminate 1 can be covered and hermetically sealed together by a single upper laminate 3 or individual conductor track structures 2 can in each case be covered and hermetically sealed by an associated laminate.

FIG. 3 shows an example of a sensor element such as can likewise be used for determining temperatures. In this respect, a lower laminate 1 of a polyimide film is again present. A thin film 5 of ceramic material is placed on this. A conductor track structure 2 such as described in accordance with FIG. 1, for example, was printed on the upwardly facing side. An upper laminate 3 of a polyimide film was then again applied to the total surface and connected to the laminate 1 with material continuity and in a fluid-tight manner at least along the outer margins.

A matrix arrangement can likewise be used in cells with a plurality of these sensor elements. The function corresponds to those such as explained in the example in accordance with FIG. 1.

FIG. 3 shows a sensor element with which pressures or forces can be determined in three views.

Three views of an example of a sensor element for determining pressure and/or acting mechanical forces which can be used in electrochemical cells are shown in FIG. 4.

A structured copper layer (thickness 25 μm) for connector contacts 2" is also formed here as in the example in accordance with FIG. 1 on a 25 μm thick polyimide film as a laminate 1. In addition, a conductor track structure 2 is formed in a sensitive region as an interdigital structure, finger structure or in meandering form, likewise as in the example in accordance with FIG. 1.

A plate-like electrically conductive element 4 in the form of a graphite film (GDL) is similarly applied on the conductor track structure 2 in the sensitive region 2'. The whole is again covered by an upper laminate 3 as a polyimide film and a hermetic closure is achieved.

If a pressure or compressive fore is now active, as indicated by the arrow, the plate-like element 4 is pressed against the conductor track structure 2. In dependence on the pressure or the force, the plate-like element 4 is pressed against the individual structural elements of the conductor track structure 2, whereby the electrical conductivity or the electrical resistance varies in dependence on the pressure or on the force which can be used as a measure for the pressure or force.

The sensor element again had a total thickness <90 µm.

FIG. 5 shows an example of a sensor element for determining the electrical conductivity which can be used in electrochemical cells and which can also be used as a reference sensor in two views.

The laminate 1, which was again a polyimide film with a thickness of 25 µm and was provided with a structured copper layer (thickness 25 µm) for electrical connector contacts 2" was again provided with a printed conductor track structure 2 in the form of a plurality of parallel and equally long layer strips arranged at intervals from one another. They form electrodes in this respect. Except for regions for an electrical contact left free at the outer margin, they were again covered by the upper laminate 3 which was connected, peripherally at the outer margin, with material continuity and in a fluid-tight manner to the laminate 1.

A 4-electrode arrangement is shown in FIG. 4 with which the electrical conductivity of the electrolyte of the cell can be determined.

When one of these four electrodes is used as a reference electrode, the electrical impedance of the respective cell can be determined via the other three electrodes.

The invention claimed is:

1. An electrochemical cell of a rechargeable battery having at least one sensor element, characterized in that the sensor element(s) is/are arranged within the cell, integrated therein, and a sensor element is configured as an electrically conductive layer-wise conductor track structure (2) on a surface of a dielectric laminate (1) which is configured in the form of a thin film, and the conductor track structure (2) is sealed in a fluid tight manner, except for regions provided at the outer margin for an electrical contact, by a further dielectric laminate (3) which is configured in the form of a film and is arranged on the conductor track structure (2).

2. A cell in accordance with claim 1, characterized in that the laminates (1, 3) are formed from a polymer or from a ceramic material.

3. A cell in accordance with claim 1, characterized in that a sensor element is configured as a temperature sensor, a pressure sensor, a force-measuring sensor, a sensor for determining the electrical conductivity or the half-cell potential and/or as a sensor for measuring the impedance in the cell.

4. A cell in accordance with claim 1, characterized in that a sensor element has a maximum thickness of 150 µm.

5. A cell in accordance with claim 1, characterized in that a temperature sensor is configured as a thermistor or as a thermal element, wherein with a thermal element the conductor track structure (2) is formed by two different metals which are electrically conductive connected to one another in a region and exposed regions of the different metals are formed for an electrical contact or these regions are electrically conductive connected to the different metals.

6. A cell in accordance with claim 1, characterized in that one or more sensor elements is/are immersed in the electrolyte of the cell and is/are attached to a surface of one of the electrodes of the cell or to a surface of a separator device.

7. A cell in accordance with claim 1, characterized in that the cell is a lithium ion cell or a modification of a lithium ion cell.

8. A cell in accordance with claim 1, characterized in that a sensitive region (2') is formed at the conductor track structure (2).

9. A cell in accordance with claim 8, characterized in that the sensitive region (2') of the conductor track structure (2) is formed as an interdigital structure and/or by a piezoceramic material.

10. A cell in accordance with claim 1, characterized in that the conductor track structure (2) is formed with metallic particles and a binder.

11. A cell in accordance with claim 8, characterized in that a plate-like electrically conductive element (4) is arranged between the sensitive region (2') of the conductor track structure (2) and the upper laminate (3).

* * * * *